May 13, 1958     T. H. SARCHET     2,834,599
TRAILER BODY HOUSE AND CHASSIS
Filed April 5, 1957     2 Sheets-Sheet 2
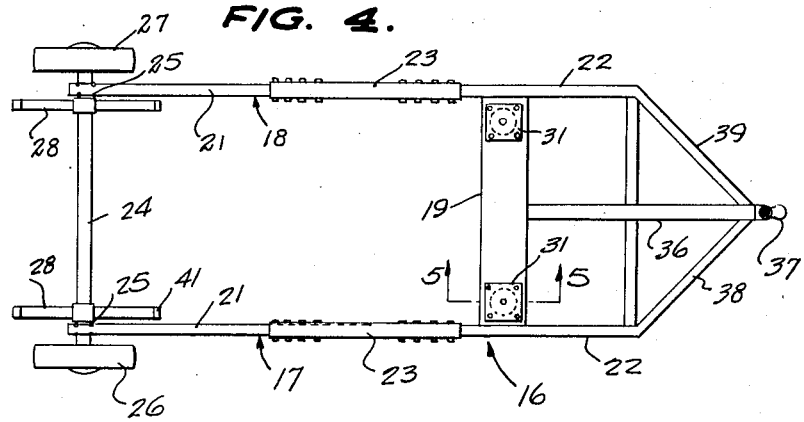
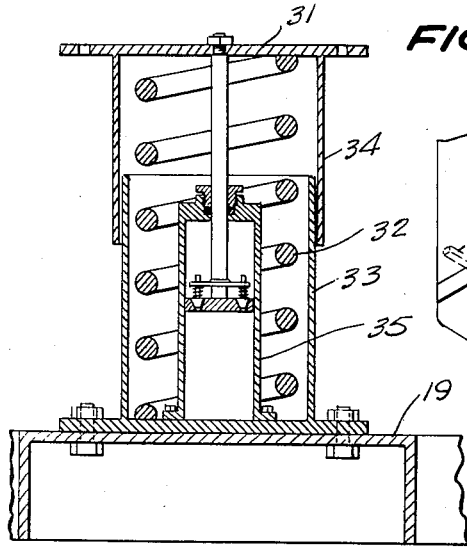
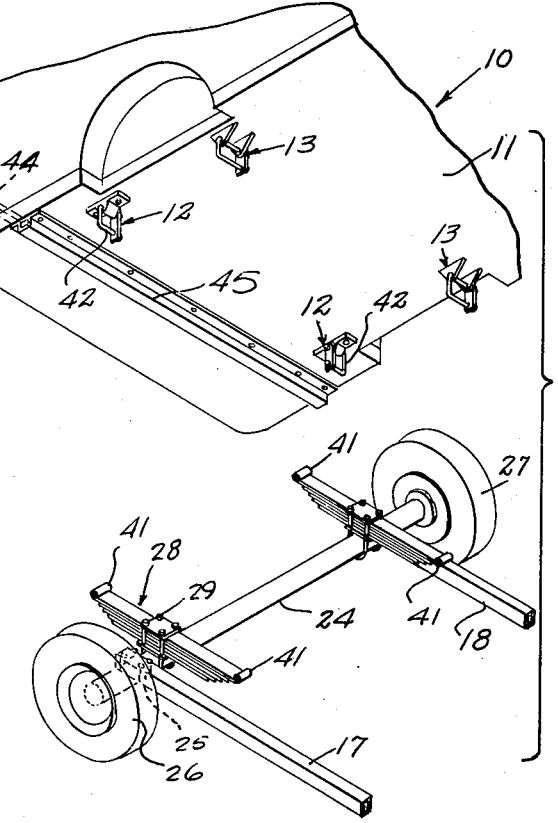
INVENTOR.
THOMAS H. SARCHET,
BY
McMorrow, Berman & Davidson
ATTORNEYS.

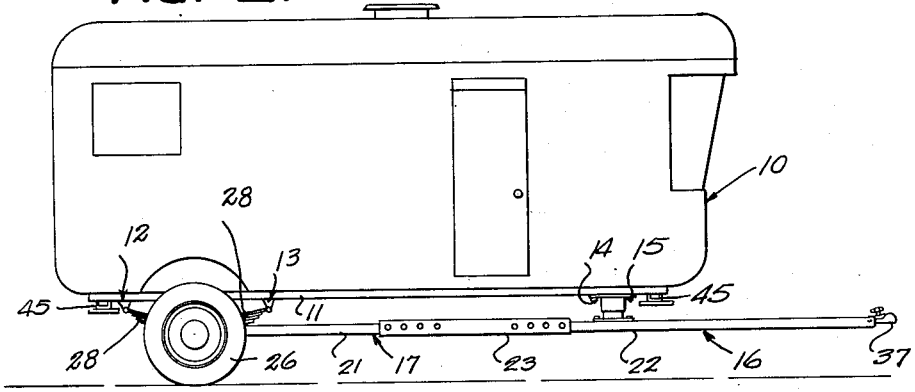
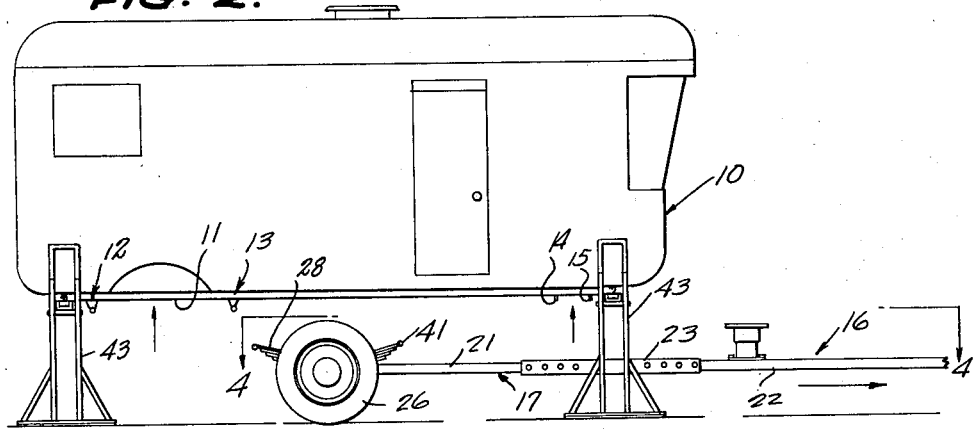
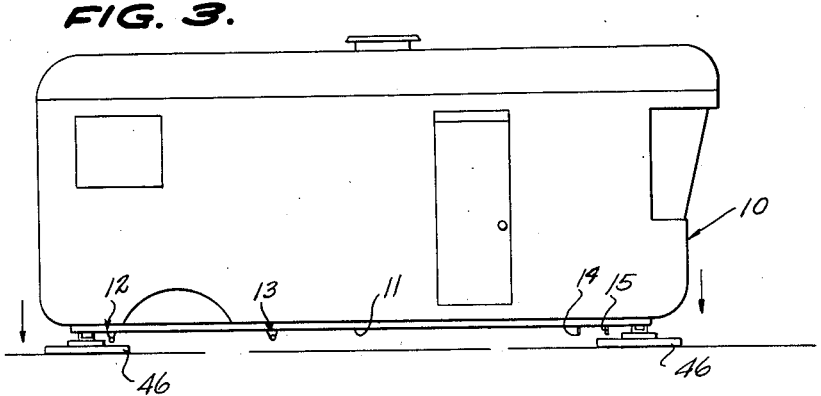

United States Patent Office 2,834,599
Patented May 13, 1958

2,834,599

TRAILER BODY HOUSE AND CHASSIS

Thomas H. Sarchet, Spokane, Wash.

Application April 5, 1957, Serial No. 650,912

3 Claims. (Cl. 280—30)

The present invention relates to a trailer body house and chassis.

An object of the present invention is to provide a trailer body house and chassis which lends itself to safe and efficient moving of said house from one location to another.

Another object of the present invention is to provide a trailer body house and chassis which obviates the necessity of maintaining a trailer chassis and wheels by a trailer body house occupant, such chassis and wheels being needed infrequently and being subject to constant deterioration due to weather elements.

Another object of the present invention is to provide a trailer body house and chassis which enables a trailer body house occupant to mount the house on a low, solid foundation protecting the floor of the house from the elements and providing for greater warmth and greater stability of the house.

A further object of the present invention is to provide a trailer body house and chassis of sturdy construction and simple structure, one which affords greater stability to the house and permits using of stronger and heavier materials than presently in use, and one which is economically feasible.

These and other objects and advantages of the present invention will be fully apparent from the following description when taken in connection with the annexed drawings, in which:

Figure 1 is an elevational view of the trailer body house and chassis of the present invention, showing the chassis in a supporting position beneath the house;

Figure 2 is an elevational view of the assembly of Figure 1, showing the trailer body house elevated for movement of the chassis out of the supporting position;

Figure 3 is an elevational view of the trailer body house, showing it mounted upon a ground surface and foundation;

Figure 4 is a plan view of the chassis;

Figure 5 is a sectional view, on an enlarged scale, taken on line 5—5 of Figure 4; and Figure 6 is an exploded perspective view of the leaf spring and axle assembly of the chassis according to the present invention.

Referring in greater detail to the drawings in which like numerals indicate like parts throughout the several views, the present invention comprises a trailer body house and chassis in combination, the trailer body house being of conventional construction and designated by the reference numeral 10 and including a floor 11 having depending means for attaching spring elements inwardly of each of the forward and rearward ends of the house. Such means may embody, as shown in Figure 6, a pair of spring shackles 12 and 13 arranged in longitudinal spaced relation and positioned along each of the sides of the house 10 inwardly of the rear end of the house 10 and dependingly carried by the house floor 11. Such means may also embody longitudinally spaced attaching elements 14 and 15 positioned along each of the sides of the house 10 inwardly of the forward end of the house 10 and dependingly carried by the house floor 11. The attaching elements 14 and 15 consist in bolts extending through the house floor 11 and having portions adjacent the free ends depending from the house floor 11.

The chassis of the present invention is designated generally by the reference numeral 16 and is movable, when the house 10 is in an elevated position as in Figure 2, into and out of a supporting position, such as is shown in Figure 1, with respect to the house 10. The chassis 16 comprises a bed frame including spaced side members 17 and 18 and a cross beam 19 extending between the side members 17 and 18 inwardly of the forward end of the frame and having its ends secured to the adjacent side members 17 and 18. Each side member 17 and 18 is constructed of two parts 21 and 22 connected together at their adjacent ends by a sleeve 23, permitting the extension and retraction of the side members 17 and 18 so that the chassis 16 may be shortened or lengthened so as to accommodate the trailer body houses of various lengths.

An axle 24 extends transversely of the side members 17 and 18 adjacent the rear ends of the latter and is secured to the side members 17 and 18 by means of a U-bolt 25 surrounding the axle 24 and anchored in each of the side members 17 and 18.

Rotatable wheels 26 and 27 support the ends of the axle 24 with suitable bearing means (not shown) provided so that the wheels 26 and 27 will be free rolling upon a ground surface.

A horizontally disposed leaf spring assembly 28, having its arms extending in an upright direction, is arranged transversely of the axle 24 inwardly of each of the wheels 26 and 27 and has its intermediate portion carried by the axle 24 by the attachment thereto of other U-bolts 29.

A horizontally disposed support plate 31 is arranged above the cross beam 19 adjacent each end thereof with resilient means, embodying a coiled spring as shown in Figure 5, interposed between the plate 31 and the adjacent portion of the beam 19 and supporting the plate 31 in spaced relation with respect to the beam 19, the coil spring being designated by the reference numeral 32.

Preferably, the coil spring 32 has its lower end fixedly secured to the adjacent portion of the cross beam 19 and its upper end fixed to the associated plate 31 and has a cylindrical hollow member 33 extending around it with a sleeve 34 circumposed about the member 33 and fixed to the underside of the plate 31. A dashpot assembly 35 is positioned concentrically within the coil spring 32 and is connected to the plate 31 and the cross beam 19 for dampening the resilient action of the coil spring 32.

A tongue 36 projects longitudinally from the forward end of the frame and is provided on its free end with a trailer hitch 37 for attachment to a towing vehicle. Angular braces 38 and 39 support the tongue 36 in its longitudinally extending position.

The ends of each of the leaf spring assemblies 28 are provided with upwardly turned loops 41 through which extend the associated U-bolts 42 of the spring shackle 12 or 13 for detachably connecting the spring shackles 12 or 13 to the adjacent spring assembly 28 when the chassis 16 has been moved to the supporting position, shown in Figure 1, from the position out from under the trailer body house 10 as shown in Figure 2. The bolts which constitute the attaching elements 14 and 15 enter holes provided in each of the plates 31 and suitable nuts, not shown, secure the plates 31 to the underside of the floor 11 when the chassis 16 is in the supporting position.

In use, the trailer body house 10 and chassis 16 of the present invention permits the owner or occupant of the house 10 to have the house 10 moved for him by a commercial hauling agency, obviating the necessity of the occupant maintaining a wheel support chassis in between moving of the house 10 which may be as infrequent as twice a year. It is intended that the agency have control over and possibly own the chassis 16 and to make the same available to trailer home occupants on a commercial basis. With increased size of trailer homes, it is no longer feasible for the average trailer home occupant to tow his trailer home with his own automobile and a separable chassis 16 permits the trailer house occupant to have his home moved for him as well as enabling him to set the house 10 on a ground surface or low and solid foundation. On such a foundation it is economically feasible to "winterize" the space beneath the floor 11 to protect the same from the wind and dampness. It is also possible to build the house 10 of sturdier and stronger materials for the reason that the weight of such materials is no longer a predominant characteristic in the building of such trailer body homes.

An efficient method of raising the trailer house body 10 from the chassis 16, for lowering to a foundation, consists in providing ratchet-type chain jack assemblies 43, not shown in detail as not a part of the invention. A solid bar 44, shown in dotted lines in Figure 6, is slidable into and out of each end of a channel support beam 45 at each end of the trailer body house 10 and forms a means for attaching the lifting element of the adjacent jack assembly 43, for lifting the house 10 from the chassis 16 and then lowering the body 10 to a foundation 46.

What is claimed is:

1. The combination with a trailer body house supported above a ground surface and including a floor, a pair of spring shackles arranged in longitudinal spaced relation positioned along each of the sides of the house inwardly of the rear end of said house and dependingly carried by the house floor, and longitudinally spaced attaching elements positioned along each of the sides of said house inwardly of the forward end of said house and dependingly carried by the house floor, of a mobile supporting chassis movable into and out of a supporting position beneath said house floor, said chassis comprising a bed frame, an axle extending transversely of said frame adjacent the rear end thereof and carried by said frame, a rotatable wheel supporting each end of said axle, a horizontally disposed spring assembly arranged transversely of said axle and inwardly of each of said wheels, a horizontally disposed support plate arranged above and along said frame on each side of and inwardly of the forward end of said frame and resiliently supported on said frame, a tongue projecting longitudinally from the forward end of said frame and having means on the free end thereof for attachment to a towing vehicle, said spring assemblies and said supporting plates of said chassis being detachably connectable to said spring shackles and fastening elements respectively when said chassis has been moved to the supporting position beneath said trailer body house.

2. The combination with a trailer body house supported above a ground surface and including a floor, a pair of spring shackles arranged in longitudinal spaced relation positioned along each of the sides of said house inwardly of the rear end of said house and dependingly carried by the house floor, and longitudinally spaced attaching elements positioned along each of the sides of said house inwardly of the forward end of said house and dependingly carried by said house floor, of a mobile supporting chassis movable into and out of a supporting position beneath said house floor, said chassis comprising a bed frame, including spaced side members and a cross beam extending between said side members inwardly of the forward end of said frame and having the ends thereof connected to said side members, an axle extending transversely of said frame adjacent the rear end thereof and carried by said frame, a rotatable wheel supporting each end of said axle, a horizontally disposed spring assembly arranged transversely of said axle and inwardly of each of said wheels, a horizontally disposed support plate arranged above said beam adjacent each end thereof, resilient means interposed between each of said plates and the adjacent portion of said beam and supporting said plate, a tongue projecting longitudinally from the forward end of said frame and having means on the free end thereof for attachment to a towing vehicle, said spring assemblies and said supporting plates of said chassis being detachably connectable to said spring shackles and fastening elements respectively when said chassis has been moved to the supporting position beneath said trailer body house.

3. The combination with a trailer body house supported above a ground surface and including a floor, a pair of spring shackles arranged in longitudinal spaced relation positioned along each of the sides of said house inwardly of the rear end of said house and dependingly carried by the house floor, and longitudinally spaced attaching elements positioned along each of the sides of said house inwardly of the forward end of said house and dependingly carried by said house floor, of a mobile supporting chassis movable into and out of a supporting position beneath said house floor, said chassis comprising a bed frame including spaced side members and a cross beam extending between said side members inwardly of the forward end of said frame and having the ends thereof connected to said side members, an axle extending transversely of said frame adjacent the rear end thereof and carried by said frame, a rotatable wheel supporting each end of said axle, a horizontally disposed leaf spring assembly arranged transversely of said axle and inwardly of each of said wheels and having its intermediate portion carried by said axle, a horizontally disposed support plate arranged above said beam adjacent each end thereof, resilient means interposed between each of said plates and the adjacent portion of said beam and supporting said plate, a tongue projecting longitudinally from the forward end of said frame and having means on the free end thereof for attachment to a towing vehicle, the ends of each of said leaf spring assembly and said supporting plates of said chassis being detachably connectable to said spring shackles and fastening elements respectively when said chassis has been moved to the supporting position beneath said trailer body house.

References Cited in the file of this patent

UNITED STATES PATENTS 2,751,234   Couse _____ June 19, 1956